(12) United States Patent
Ueda et al.

(10) Patent No.: US 8,364,349 B2
(45) Date of Patent: Jan. 29, 2013

(54) MOTOR CONTROLLER AND ELECTRIC POWER STEERING APPARATUS WITH TEMPERATURE DETECTOR OF THE MOTOR

(75) Inventors: Takeshi Ueda, Kashiba (JP); Shigeki Nagase, Nabari (JP); Hiroshi Sumasu, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 254 days.

(21) Appl. No.: 12/811,774

(22) PCT Filed: Jan. 6, 2009

(86) PCT No.: PCT/JP2009/050031
§ 371 (c)(1),
(2), (4) Date: Jul. 6, 2010

(87) PCT Pub. No.: WO2009/087991
PCT Pub. Date: Jul. 16, 2009

(65) Prior Publication Data
US 2010/0280714 A1     Nov. 4, 2010

(30) Foreign Application Priority Data
Jan. 7, 2008   (JP) .................................. 2008-000295

(51) Int. Cl.
*G06F 19/00*           (2011.01)
(52) U.S. Cl. ............ 701/42; 701/41; 388/833; 388/934; 318/400.08; 318/400.12; 318/504
(58) Field of Classification Search ..................... 701/41, 701/42; 388/825, 833, 934; 318/400.08, 318/400.09, 400.12, 400.42, 471–473, 479, 318/504
See application file for complete search history.

(56) References Cited

U.S. PATENT DOCUMENTS

| 7,589,490 B2 * | 9/2009 | Haesters et al. ............. 318/471 |
| 2003/0071594 A1 | 4/2003 | Kleinau et al. |
| 2003/0076061 A1 | 4/2003 | Kleinau et al. |
| 2003/0076064 A1 | 4/2003 | Kleinau et al. |
| 2003/0076065 A1 | 4/2003 | Shafer et al. |
| 2007/0132446 A1 | 6/2007 | Kleinau et al. |
| 2008/0191655 A1 | 8/2008 | Ueda et al. |
| 2009/0240389 A1* | 9/2009 | Nomura et al. ................. 701/41 |

FOREIGN PATENT DOCUMENTS

| JP | 2000 184773 | 6/2000 |
| JP | 2001 187578 | 7/2001 |
| JP | 2003 134869 | 5/2003 |
| JP | 2003134869 A * | 5/2003 |
| JP | 2007 202295 | 8/2007 |
| JP | 2007202295 A * | 8/2007 |

* cited by examiner

*Primary Examiner* — Gerald McClain
(74) *Attorney, Agent, or Firm* — Oblon, Spivak, McClelland, Maier & Neustadt, L.L.P.

(57) ABSTRACT

An angle calculator determines an angle of a rotor. An angular speed calculator determines an angular speed of the rotor. A command current calculator determines a command current defined on a dq-axis. An open loop controller determines a command voltage defined on the dq-axis in accordance with a circuit equation of a motor, based on the command current and the angular speed. A dq-axis/three-phase converter converts the command voltage into a three-phase command voltage. A resistance calculator and a Φ-value calculator respectively determines circuit resistance including armature winding resistance and a number of armature winding linkages which are included in the circuit equation of the motor, based on temperature of the motor detected by a temperature sensor and with reference to a table or the like which is stored in advance.

8 Claims, 4 Drawing Sheets

MOTOR CONTROLLER AND ELECTRIC POWER STEERING APPARATUS WITH TEMPERATURE DETECTOR OF THE MOTOR

TECHNICAL FIELD

The present invention relates to a motor controller and an electric power steering apparatus equipped with the motor controller.

BACKGROUND ART

In a hitherto employed electric power steering apparatus, an electric motor is driven according to steering torque applied to a handle (a steering wheel) by a driver, thereby imparting steering assistance power to a steering mechanism of a vehicle. Although a brush motor has heretofore, widely been used for the electric motor of the electric power steering apparatus, a brushless motor is also used in recent years in view of enhancement of reliability and durability and a reduction in inertia.

In order to control torque developing in the motor, a motor controller generally detects an electric current flowing through the motor, to thus perform PI control (proportional-plus-integral control) operation in accordance with a difference between an electric current supplied to a motor and a detected electric current. In order to detect an electric current of two phases or more, the motor controller for driving a three-phase brushless motor is provided with two or three current sensors.

In relation to the present invention, Japanese Patent Publication No. 2001-187578A discloses determining a d-axis command voltage and a q-axis command voltage by use of a circuit equations of a motor. Japanese Patent Publication No. 2000-184773A discloses correction of a d-axis command current according to a temperature of a motor.

DISCLOSURE OF THE INVENTION

Problem to be Solved by the Invention

In a motor controller incorporated in the electric power steering apparatus, a current sensor must detect a heavy current of 100 A or more. The current sensor is large and hinders downsizing of a controller of the electric power steering apparatus. Therefore, a challenge to be met by the motor controller incorporated in the electric power steering apparatus is to reduce the number of current sensors. So long as the number of current sensors can be reduced, the cost and power consumption of the motor controller can also be reduced.

A conceivable method for reducing the number of current sensors includes a method for reducing the number of current sensors to be single and performing feedback control as in the conventional art, a method for eliminating all of the current sensors and performing open loop control (feedforward control) according to a circuit equations of a motor.

However, the former method eventually requires a single current sensor. Depending on the rotational position of the rotor of the motor, the single current sensor may fail to detect an electric current of a plurality of phases required for feedback control, which in turn raise a problem of occurrence of discontinuous motor control. The latter method encounters a problem of a failure to correctly drive a motor when parameters included in the circuit equations of the motor vary according to an ambient temperature.

Therefore, an object of the present invention to provide a motor controller capable of driving a motor with high precision even when variations arise in parameters used to calculate a motor drive voltage, and to provide an electric power steering apparatus equipped with the motor controller.

How to Solve the Problems

According to the first aspect of the invention, there is provided a motor controller configured to drive a motor, comprising:

an open loop controller configured to determine a level of a command voltage that is to be used to drive the motor according to a circuit equation of the motor, based on a command current value indicative of an amount of current that is to be supplied to the motor, and to an angular speed of a rotor in the motor;

a motor driver configured to drive the motor with the level of the command voltage determined by the open loop controller;

a temperature detector configured to detect temperature of the motor or temperature capable of estimating the temperature of the motor; and a parameter calculator configured to calculate, based on the temperature detected by the temperature detector, at least one of a number of armature winding linkages and circuit resistance including armature winding resistance, that are included in the circuit equation and are parameters to be used to determine the level of the command voltage.

According to the second aspect of the invention, in the first aspect of the invention, the parameter calculator includes a table or a formula stored in advance and indicative of a correspondence between the temperature detected by the temperature detector and at least one of the number of armature winding linkages and the circuit resistance including the armature winding resistance. The parameter calculator is configured to calculate at least one of the number of armature winding linkages and the circuit resistance including the armature winding resistance based on the table or the formula.

According to the third aspect of the invention, in the first aspect of the invention, the motor controller further comprises: a position detector configured to detect a position of the rotor in the motor which is a brushless motor; and an angular speed detector configured to calculate the angular speed of the rotor based on the position detected by the position detector. The open loop controller is configured to determine the level of the command voltage based on the angular speed calculated by the angular speed detector.

According to the fourth aspect of the invention, there is provided an electric power steering apparatus comprising the motor controller according to any one of the first to third aspect of the invention.

According to the first aspect of the invention, at least one of the circuit resistance including armature winding resistance and the number of armature winding linkages which are parameters to be used to obtain the level of the command voltage is determined on the basis of the temperature detected by the temperature detector. Therefore, even when these parameters vary due to temperature change, the motor is driven with high precision, and a desired motor output can be obtained.

According to the second aspect of the invention, at least one of the circuit resistance including the armature winding resistance and the number of armature winding linkages is readily determined according to the table or mathematical formula stored in advance.

According to the third aspect of the invention, the angular speed of the rotor is calculated from a detection result yielded by the rotor position detector usually provided with the brushless motor. Therefore, the motor can be controlled with a simple configuration.

According to the fourth invention, even when at least one of the circuit resistance including armature winding resistance and the number of armature winding linkages to be used to determine the level of the command voltage varies due to temperature change, the motor is driven with high precision, and a desired motor output can be produced. Hence, smooth steering assistance can be performed.

BEST MODE FOR CARRYING OUT THE INVENTION

1. Overall Configuration

Figure 1:
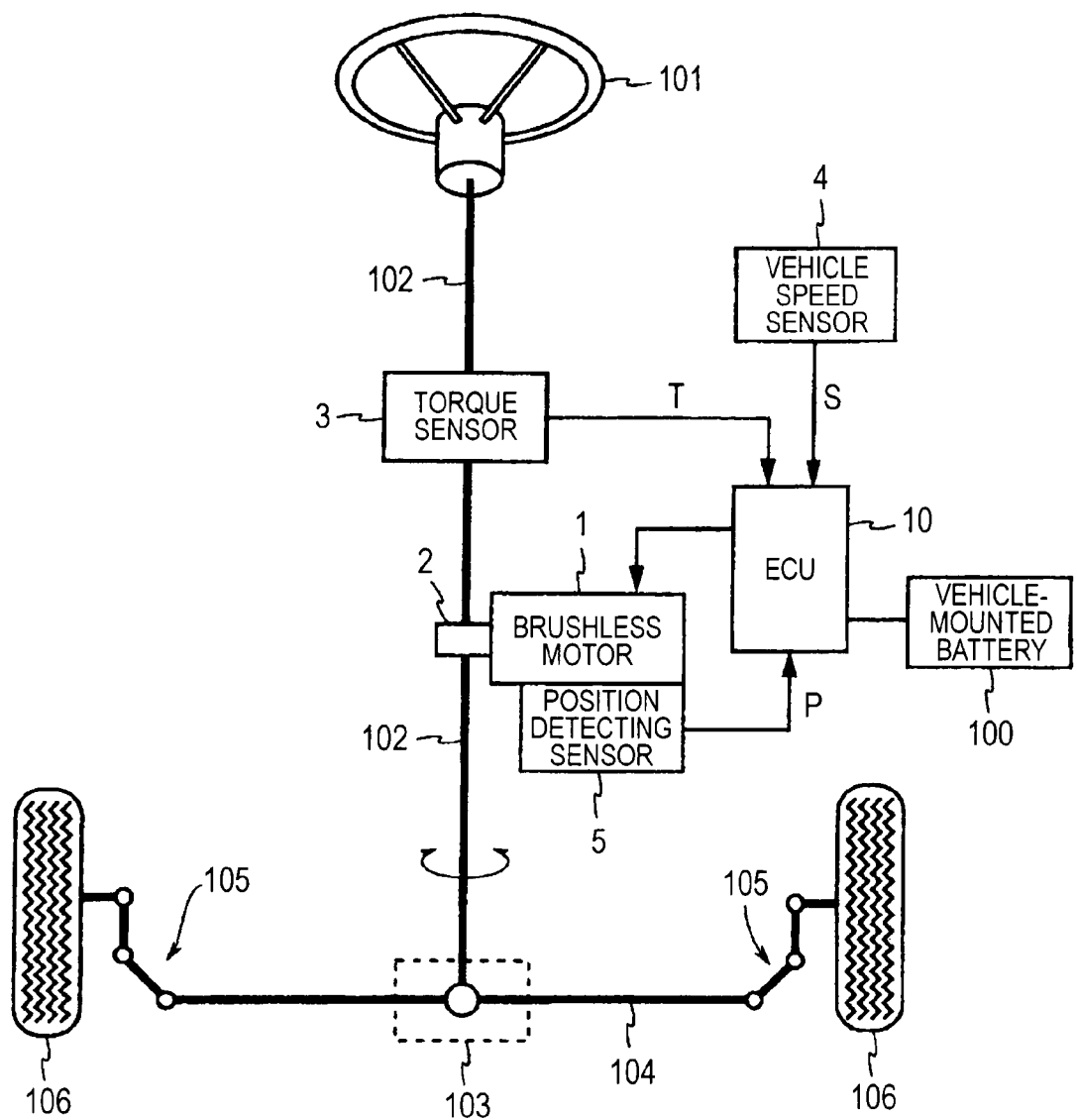
FIG. 1 is a block diagram showing configuration of an electric power steering apparatus according to an embodiment of the present invention.

FIG. 1 is a schematic diagram showing configuration of an electric power steering apparatus according to an embodiment of the present invention, and showing configuration of a relevant vehicle. The electric power steering apparatus shown in FIG. 1 is an electric power steering apparatus of a column assisting type equipped with a brushless motor 1, a decelerator 2, a torque sensor 3, a vehicle speed sensor 4, a position detecting sensor 5, and an electronic control unit (hereinafter referred to as ECU) 10.

As shown in FIG. 1, a handle (a steering wheel) 101 is fixed to one end of a steering shaft 102, and the other end of the steering shaft 102 is coupled to a rack shaft 104 by way of a rack pinion mechanism 103. Both ends of the rack shaft 104 are coupled to wheels 106 by way of a coupler 105 including a tie rod and a knuckle arm. When a driver turns the steering wheel 101, the steering shaft 102 rotates, so that the rack shaft 104 accordingly performs a reciprocating motion. Directions of the wheels 106 are changed in accordance with the reciprocating motion of the rack shaft 104.

In order to reduce a driver's burden, the electric power steering apparatus performs steering assistance described later. The torque sensor 3 detects steering torque T applied to the steering shaft 102 through operation of the steering wheel 101. The vehicle speed sensor 4 detects vehicle speed S. The position detecting sensor 5 detects a rotational position P of a rotor of the brushless motor 1. The position detecting sensor 5 includes; for instance, a resolver.

The ECU 10 is supplied with electric power from a vehicle-mounted battery 100 and drives the brushless motor 1 in accordance with the steering torque T, the vehicle speed S, and the rotational position P. The brushless motor 1 is driven by the ECU 10, thereby generating steering assistance power. The decelerator 2 is interposed between the brushless motor 1 and the steering shaft 102. The steering assistance power generated by the brushless motor 1 is applied to rotate the steering shaft 102 by way of the decelerator 2.

As a consequence, the steering shaft 102 is rotated by both the steering torque applied to the steering wheel 101 and the steering assistance power generated by the brushless motor 1. The electric power steering apparatus performs steering assistance by applying steering assistance power generated by the brushless motor 1 to the steering mechanism of the vehicle.

The electric power steering apparatus according to the embodiment of the present invention is characterized by a controller (a motor controller) for driving the brushless motor 1. The motor controller included in the electric power steering apparatus of the embodiment will be described below.

2. Configuration and Operation of the Motor Controller

Figure 2:
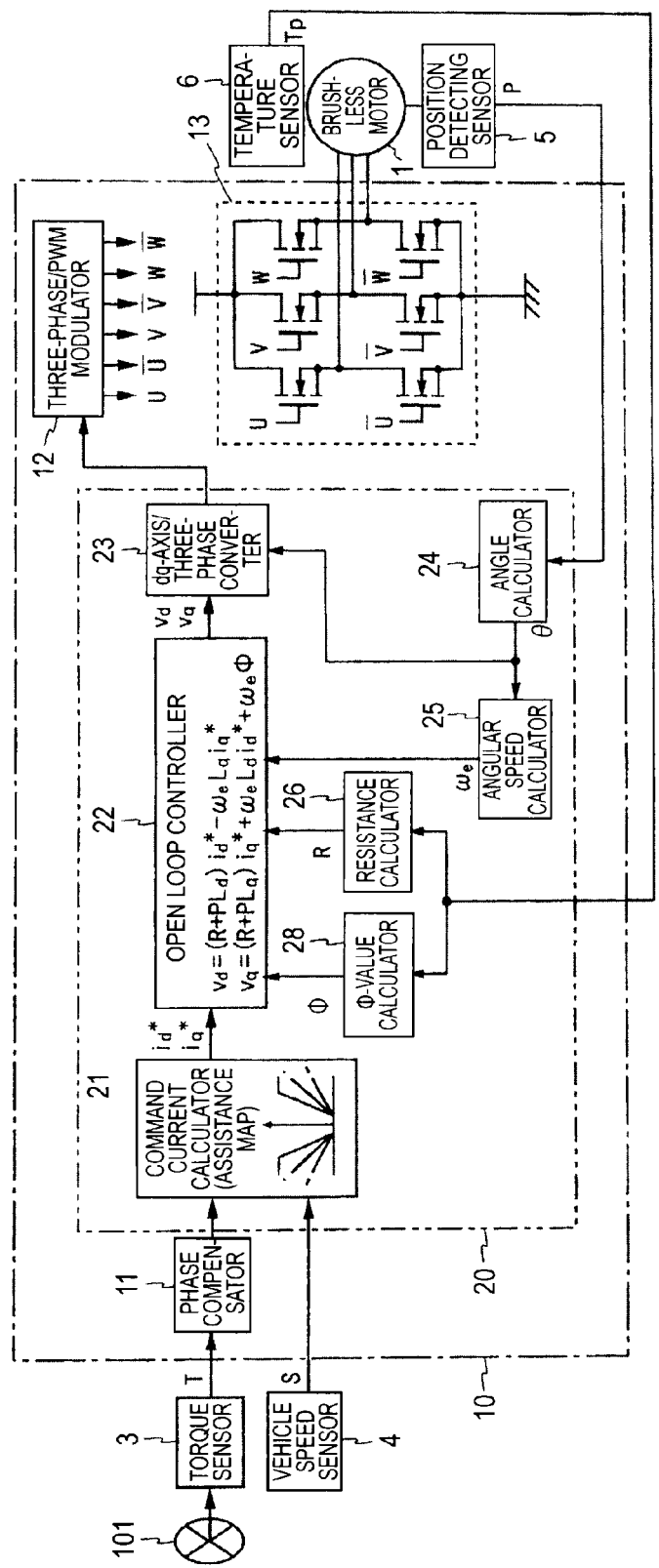
FIG. 2 is a block diagram showing configuration of a motor controller according to the embodiment of the present invention.

FIG. 2 is a block diagram showing the configuration of the motor controller according to a first embodiment of the present invention. The motor controller shown in FIG. 2 is provided with the ECU 10 to drive the brushless motor 1 with coils (not shown) of three phases, including a u-phase, a v-phase, and a w-phase. The ECU 10 has a phase compensator 11, a microcomputer 20, a three-phase/PWM (Pulse Width Modulation) modulator 12, and a motor driving circuit 13.

The steering torque T output from the torque sensor 3, the vehicle speed S output from the vehicle speed sensor 4, the rotational position P output from the position detecting sensor 5, and a temperature Tp of the brushless motor 1 output from a temperature sensor 6 (not shown in FIG. 1) are input to the ECU 10. The phase compensator 11 subjects the steering toque T to phase compensation. The microcomputer 20 serves as a controller for determining a level of a command voltage used for driving the brushless motor 1. Detailed function of the microcomputer 20 will be described later.

The three-phase/PWM modulator 12 and the motor driving circuit 13 are provided with hardware (circuitry) and serve as a motor driver for driving the brushless motor 1 by use of the level of the voltage determined by the microcomputer 20. The three-phase/PWM modulator 12 generates three types of PWM signals (U, V, and W signals shown in FIG. 2) having duty ratios corresponding to the levels of the voltages of three phases determined by the microcomputer 20. The motor driving circuit 13 is a PWM voltage type inverter circuit including six MOS-FETs (Metal Oxide Semiconductor Field Effect Transistors) as switching elements. The six MOS-FETs are controlled by the three types of the PWM signals and their negate signals. Conducting states of the MOS-FETs are controlled by use of the PWM signals, whereby the electric currents of three phases (the U-phase current, the V-phase current, and the W-phase current) are supplied to the brushless motor 1. The motor driving circuit 13 has a plurality of switching elements as mentioned the above and serving as a switching circuit that supplies the brushless motor 1 with an electric current. A shunt resistor can also be provided between a negative side (a ground) or a positive side of the power source and the motor driving circuit 13.

The microcomputer 20 executes a program stored in built-in memory (not shown) in the ECU 10, thereby serving as a command current calculator 21, an open loop controller 22, a dq-axis/three-phase converter 23, an angle calculator 24, an angular velocity calculator 25, a resistance calculator 26, and a Φ-value calculator 28. As described below, the microcomputer 20 determines a level of a voltage (hereinafter called a "command voltage") to be imparted to the motor driving circuit 13 from the command current value showing an amount of electric current supplied to the brushless motor 1 and the angular velocity of the rotor of the brushless motor 1 according to the circuit equations of the motor.

Figure 3:
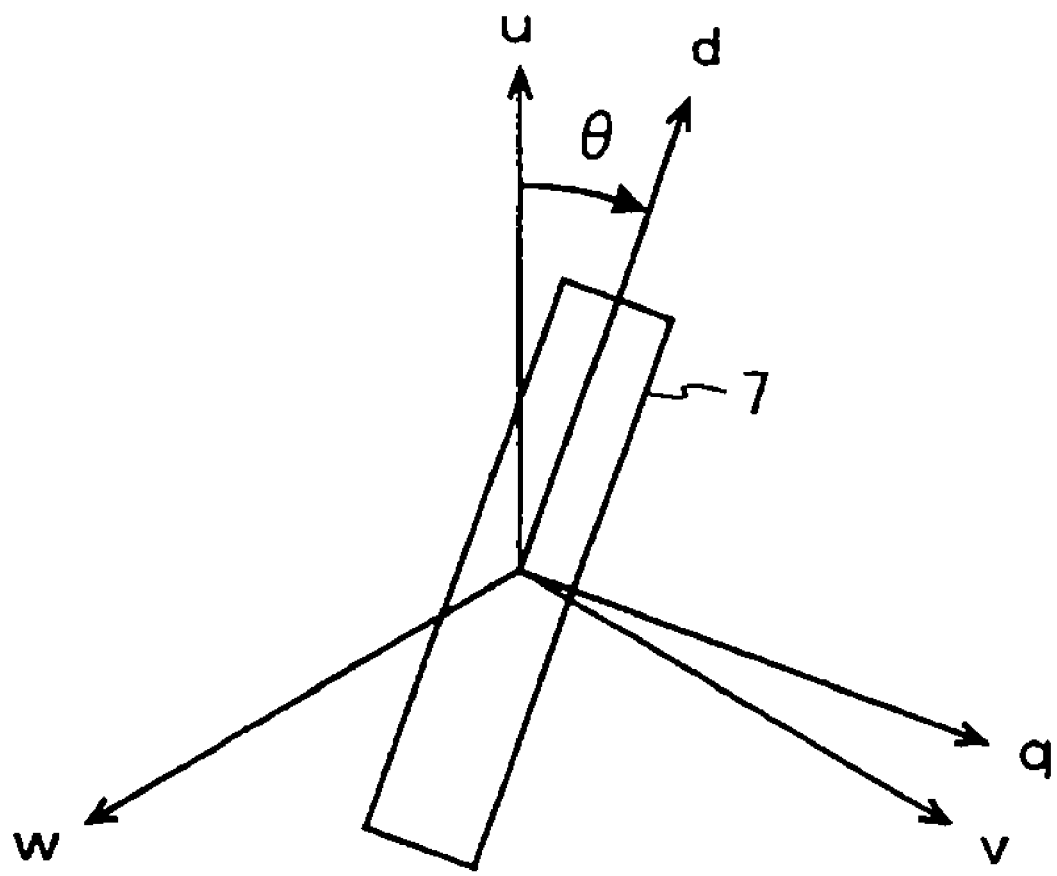
FIG. 3 is a view showing a three-phase AC coordinate and a dq-coordinate in the above embodiment.

The angle calculator 24 determines a rotational angle (will be referred to as an angle θ) of the rotor of the brushless motor 1 from the rotational position P detected by the position detecting sensor 5. The angle velocity calculator 25 determines an angular velocity $\omega_e$ of the rotor of the brushless motor 1 from the angle θ. As shown in FIG. 3, a u-axis, a v-axis, and a w-axis are set for the brushless motor 1, and a d-axis and a q-axis are set for the rotor 7 of the brushless motor 1, so that an angle which the u-axis forms with the d-axis comes to an angle θ.

From the steering torque T (a signal output from the phase compensator 11) acquired after phase compensation and the vehicle speed S, the command current calculator 21 determines a d-axis current and a q-axis current to be supplied to the brushless motor 1 (the former current will be referred to as a d-axis command current $i_d^*$, and the latter current will be referred to as a q-axis command current $i_q^*$). More specifically, the command current calculator 21 is provided with an internal table (will be referred to as an assistance map) storing a correspondence between the steering torque T and the command currents while the vehicle speed S is taken as a parameter, so that a command current is determined with reference to the assistance map. When steering torque of a certain magnitude is imparted, it is possible to determine, with reference to the assistance map, the d-axis command current $i_d^*$ and the q-axis command current $i_q^*$ to be supplied to the brushless motor 1 in order to generate steering assistance force of a magnitude appropriate for the magnitude of the steering torque.

The q-axis command current $i_d^*$ determined by the command current calculator 21 is a signed current value, and the sign designates the direction of steering assistance. For instance, when the sign is positive, steering assistance for making a right turn is performed. When the sign is negative, steering assistance for making a left turn is performed. Further, the d-axis command current $i_d^*$ is typically set to a value of zero.

The open loop controller 22 determines a d-axis voltage and a q-axis voltage (the former voltage will be referred to as a d-axis command voltage $v_d$, and the latter voltage will be referred to as a q-axis command voltage $v_q$) that are to be supplied to the brushless motor 1 from the d-axis command current $i_d^*$, the q-axis command current $i_q^*$, and the angular speed $\omega_e$. The d-axis command voltage $v_d$ and the q-axis command voltage $v_q$ are calculated by use of the circuit equations of the motor represented by Equations (1) and (2) described below.

$$v_d = (R+PL_d)i_d^* - \omega_e L_q i_q^* \quad (1)$$

$$v_q = (R+PL_q)i_q^* + \omega_e L_d i_d^* + \omega_e \Phi \quad (2)$$

In Equations (1) and (2), $v_d$ is a d-axis command voltage; $v_q$ is a q-axis command voltage; $i_d^*$ is a d-axis command current; $i_q^*$ is a q-axis command current; $\omega_e$ is angular speed of a rotor; R is circuit resistance including resistance in an armature winding; $L_d$ is d-axis self-inductance; $L_q$ is q-axis self-inductance; $\Phi$ is $\sqrt{(3/2)}$ times the maximum number of armature winding linkages of U, V, and W phases; and P is a differential operator. Of the terms, R, $L_d$, $L_q$, and $\Phi$ are taken as known parameters. The circuit resistance R includes wiring resistance occurring between the brushless motor 1 and the ECU 10, the resistance of the motor driving circuit 13 in the ECU 10, and wining resistance, and the like.

The dq-axis/three-phase converter 23 converts the d-axis command voltage $v_d$ and the q-axis command voltage $v_q$ determined by the open loop controller 22 into a command voltage on a three-phase AC coordinate axis. More specifically, the dq-axis/three-phase converter 23 determines a u-phase command voltage $V_u$, a v-phase command voltage $V_v$, and a w-phase command voltage $V_w$ from the d-axis command voltage $v_d$ and the q-axis command voltage $v_q$ by use of Equations (3) to (5) described below.

$$V_u = \sqrt{(3/2)} \cdot (v_d \cos\theta - v_q \sin\theta) \quad (3)$$

$$V_v = \sqrt{(3/2)} \cdot [v_d \cos(\theta - 2\pi/3) - v_q \sin(\theta - 2\pi/3)] \quad (4)$$

$$V_w = -V_u - V_v \quad (5)$$

The angle θ included in Equations (3) and (4) is determined by the angle calculator 24.

As mentioned the above, the microcomputer 20 performs processing for determining the command currents $i_d^*$ and $i_q^*$ on the dq-coordinate axes, processing for determining the command voltages $v_d$ and $v_q$ on the dq-coordinate axes in accordance with the circuit equations of the motor, and processing for converting the command voltages $v_d$ and $v_q$ into command voltages $V_u$, $V_v$, and $V_w$ of three phases. In accordance with the command voltages $V_u$, $V_v$, and $V_w$ of three phases determined by the microcomputer 20, the three-phase/PWM modulator 12 outputs three types of PWM signals. An electric current that has a shape of a sinusoidal wave and that is appropriate for the command voltages of respective phases flows into the three-phase winding of the brushless motor 1, so that a rotor of the brushless motor 1 rotates. Torque corresponding to the electric current flowing through the brushless motor 1 accordingly develops in the rotary shaft of the brushless motor 1. The thus-developed torque is used for steering assistance.

The resistance calculator 26 and the Φ-value calculator 28 next calculate a resistance and a Φ-value from the temperature Tp of the brushless motor 1 received from the temperature sensor 6. The reason why such calculation can be performed is that a substantial proportional relationship exists between the temperature Tp, the resistance, and the Φ-value. The relationship is described with reference to FIGS. 4 and 5.

Figure 4:
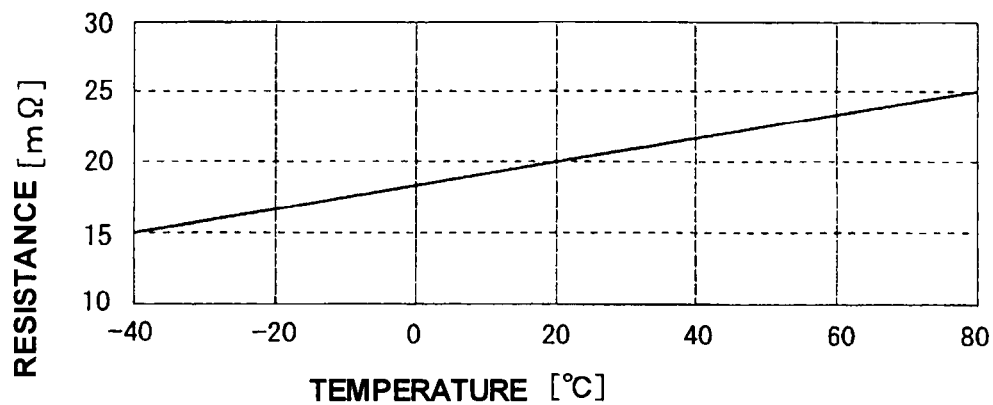
FIG. 4 is a view showing an example of relationship between temperature Tp and a resistance.
Figure 5:
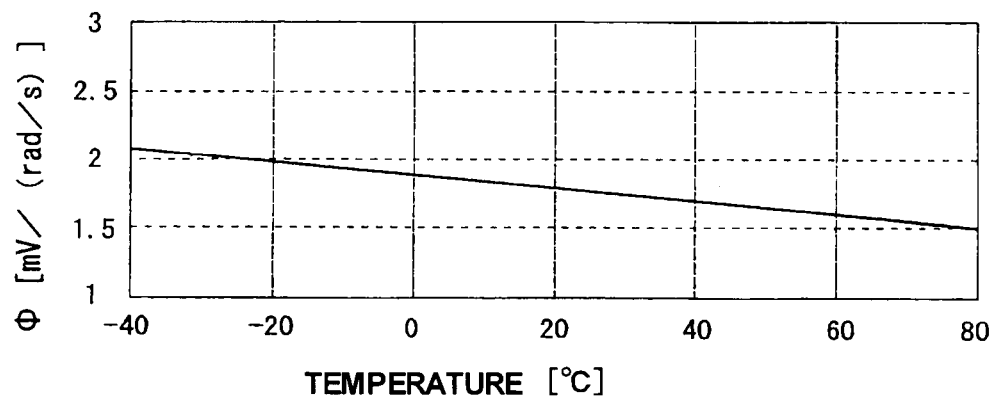
FIG. 5 is a view showing an example of relationship between temperature Tp and a Φ-value.

FIG. 4 is a view showing an example relationship between the temperature Tp and the resistance, and FIG. 5 is a view showing an example relationship between the temperature Tp and the Φ-value. As can be seen from FIGS. 4 and 5, a substantially proportional relationship exists between the temperature Tp and the resistance, and another substantially proportional relationship also exists between the temperature Tp and the Φ-value. Accordingly, the correlations are specified by a predetermined table (map), a calculation formula, an approximate formula and the like, whereby the resistance and the Φ-value can readily be calculated from the temperature Tp. Therefore, the resistance calculator 26 and the Φ-value calculator 28 store the table or formula prepared in advance and calculate the resistance and the Φ-value by use of the table or the formula.

The resistance calculator 26 and the Φ-value calculator 28 output the thus-determined resistance and the Φ-value to the open loop controller 22. When determining the q-axis command voltage $v_q$ by use of Equation (2), the open loop controller 22 uses the resistance calculated by the resistance calculator 26 and the Φ-value calculated by the Φ-value calculator 28. When the d-axis command voltage $V_d$ is determined by use of Equation (1), the resistance calculated by the resistance calculator 26 is used. As mentioned the above, the microcomputer 20 determines the circuit resistance R including the armature winding resistance and the number of armature winding linkages Φ, both of which are included in the circuit equations of the motor. When determining the q-axis command voltage $v_q$, the resistance and the Φ-value are used.

The motor controller according to the embodiment determines, from the command current value and the angular speed of the rotor, a command voltage according to the circuit equations of the motor through open loop control. The resistance and the Φ-value included in the circuit equations of the motor are determined from the temperature of the motor detected by the temperature sensor. When the command voltage is determined, the resistance and the Φ-value are used.

3. Advantageous Effect

Consequently, according to the motor controller of the present embodiment, even when the resistance and the Φ-value included in the circuit equations of the motor vary according to a temperature change, the resistance and the Φ-value are determined from the temperature Tp of the motor 1 detected by the temperature sensor 6, so that the brushless motor can be driven with high precision and that a desired motor output can be produced.

The motor controller according to the embodiment has not current sensor, so that downsizing, cost reduction, and power saving of the motor controller can be accomplished.

Further, in contrast with a motor controller that performs feedback control by use of one current sensor, the motor controller according to the embodiment performs open loop control. Hence, motor control does not become discontinuous. Therefore, according to the motor controller of the present embodiment, sound and vibration can be suppressed.

4. Modified Examples

In the embodiment, the temperature sensor 6 detects the temperature Tp of the brushless motor 1. However, the motor controller can also be configured so as to detect a temperature which is relevant to the temperature of the motor 1 and which enables estimation of the temperature of the motor 1. For instance, the motor controller can also be configured so as to detect an ambient temperature of surroundings of the motor 1, temperatures of various boards (a controller control board, a power board, and the like) included in the ECU, or ambient temperatures of surroundings of the boards. Since the temperatures are physically relevant to an internal temperature of the motor 1, the temperatures ascend likewise as the internal temperature of the motor 1 rises. Further, as the internal temperature drops, the temperatures also descend likewise. Further, a certain degree of correspondence is also admitted to exist between the temperatures and the internal temperature in terms of amounts. Therefore, the internal temperature of the motor 1 can be estimated from these temperatures to a certain extent. From the above, so long as a table or formula showing a relationship between the temperatures, the resistance, and the Φ-value is set in accordance with a test, a simulation, or the like, and stored in the resistance calculator 26 and the Φ-value calculator 28, the resistance and the Φ-value can be calculated from the table or the formula.

In the embodiment, the resistance calculator 26 and the Φ-value calculator 28 continually (without interruption) calculate the resistance and the Φ-value at predetermined control timing. However, calculation may also be performed at a predetermined interval that is longer than the control interval or performed only once at system startup.

The present embodiment has provided explanations such that the table and the formula are used for directly computing the resistance and the Φ-value from the temperature Tp. However, the resistance and the Φ-value can also be calculated indirectly. For instance, a correction coefficient showing a proportion of change corresponding to the temperature Tp for the resistance and the Φ-value serving as predetermined initial values is calculated by use of the table or the mathematical formula. The resistance and the Φ-value serving as initial values are multiplied by the calculated correction coefficient, whereby the resistance and the Φ-value to be used as parameters may also be calculated.

In the embodiment, the motor controller is configured so as to control the brushless motor 1 in accordance with the circuit equations of the motor. However, the motor controller may also control a motor provided with a brush. Alternatively, the angle calculator 24 determines the angular speed of the motor from the rotational position P detected by the position detecting sensor 5. However, the motor controller can also be configured instead that the motor is provided with an angular speed detection sensor, to thus directly detect angular speed.

In the embodiment, a current detection sensor is not provided. However, the current detection sensor may also be provided for the purpose of detecting a failure, or the like. Even in such a case, when the resistance and the Φ-value vary for reasons of a temperature change, the brushless motor is driven with high precision, so that a desired motor output can be produced.

The invention claimed is:

1. A motor controller configured to drive a motor, comprising:
   an open loop controller configured to determine a level of a command voltage that is to be used to drive the motor according to a circuit equation of the motor, based on a command current value indicative of an amount of current that is to be supplied to the motor, and to an angular speed of a rotor in the motor;
   a motor driver configured to drive the motor with the level of the command voltage determined by the open loop controller;
   a temperature detector configured to detect temperature of the motor or configured to estimate the temperature of the motor; and
   a parameter calculator configured to calculate, based on the temperature detected by the temperature detector, a number of armature winding linkages and a circuit resistance including armature winding resistance, that are each included in the circuit equation of the motor and are parameters to be used to determine the level of the command voltage.

2. The motor controller as set forth in claim 1, wherein:
   the parameter calculator includes a table or a formula stored in advance and indicative of a correspondence between the temperature detected by the temperature detector and the number of armature winding linkages and the circuit resistance including the armature winding resistance; and
   the parameter calculator is configured to calculate the number of armature winding linkages and the circuit resistance including the armature winding resistance based on the table or the formula.

3. The motor controller as set forth in claim 1, further comprising:
   a position detector configured to detect a position of the rotor in the motor which is a brushless motor; and
   an angular speed detector configured to calculate the angular speed of the rotor based on the position detected by the position detector,
   wherein the open loop controller is configured to determine the level of the command voltage based on the angular speed calculated by the angular speed detector.

4. The motor controller as set forth in claim 1, wherein the command voltage includes a first command voltage along a first axis of the motor that is based on the calculated circuit resistance including armature winding resistance and includes a second command voltage along a second axis of the motor that is based on both the calculated number of armature winding linkages and the calculated circuit resistance including armature winding resistance.

5. An electric power steering apparatus comprising:
a motor controller configured to drive a motor, comprising:
an open loop controller configured to determine a level of a command voltage that is to be used to drive the motor according to a circuit equation of the motor, based on a command current value indicative of an amount of current that is to be supplied to the motor, and to an angular speed of a rotor in the motor;
a motor driver configured to drive the motor with the level of the command voltage determined by the open loop controller;
a temperature detector configured to detect temperature of the motor or configured to estimate the temperature of the motor;
a parameter calculator configured to calculate, based on the temperature detected by the temperature detector, a number of armature winding linkages and a circuit resistance including armature winding resistance, that are each included in the circuit equation of the motor and are parameters to be used to determine the level of the command voltage.

6. The electric power steering apparatus as set forth in claim 5, further comprising:
a position detector configured to detect a position of the rotor in the motor which is a brushless motor; and
an angular speed detector configured to calculate the angular speed of the rotor based on the position detected by the position detector,
wherein the open loop controller is configured to determine the level of the command voltage based on the angular speed calculated by the angular speed detector.

7. The electric power steering apparatus as set forth in claim 5, wherein:
the parameter calculator includes a table or a formula stored in advance and indicative of a correspondence between the temperature detected by the temperature detector and the number of armature winding linkages and the circuit resistance including the armature winding resistance; and
the parameter calculator is configured to calculate the number of armature winding linkages and the circuit resistance including the armature winding resistance based on the table or the formula.

8. The electric power steering apparatus as set forth in claim 5, wherein the command voltage includes a first command voltage along a first axis of the motor that is based on the calculated circuit resistance including armature winding resistance and includes a second command voltage along a second axis of the motor that is based on both the calculated number of armature winding linkages and the calculated circuit resistance including armature winding resistance.

* * * * *